United States Patent

Willkens et al.

[11] Patent Number: 5,786,565
[45] Date of Patent: Jul. 28, 1998

[54] MATCH HEAD CERAMIC IGNITER AND METHOD OF USING SAME

[75] Inventors: Craig A. Willkens, Worcester; Linda S. Bateman, Spencer, both of Mass.

[73] Assignee: Saint-Gobain/Norton Industrial Ceramics Corporation, Worcester, Mass.

[21] Appl. No.: 789,033

[22] Filed: Jan. 27, 1997

[51] Int. Cl.⁶ .................. F23Q 7/00; F23Q 7/22; H05B 3/10
[52] U.S. Cl. .......... 219/260; 219/270; 219/542; 219/548; 252/516
[58] Field of Search .................. 219/260, 267, 219/270, 538, 539, 542, 543, 544, 546, 548, 552, 553; 252/516, 518; 501/89, 92, 96.3, 97.4, 98.6

[56] References Cited

U.S. PATENT DOCUMENTS

| | | | |
|---|---|---|---|
| 3,875,477 | 4/1975 | Fredriksson et al. | 219/553 |
| 3,974,106 | 8/1976 | Richerson | 252/516 |
| 5,045,237 | 9/1991 | Washburn | 252/516 |
| 5,085,804 | 2/1992 | Washburn | 252/516 |
| 5,191,508 | 3/1993 | Axelson et al. | 361/257 |
| 5,514,630 | 5/1996 | Willkens et al. | 501/89 |
| 5,564,618 | 10/1996 | Axelson | 228/124.1 |

OTHER PUBLICATIONS

Axelson et al, *The Mini–Igniter: A New Concept in Ceramic HSI Technology*, Norton Company, pp. 579–590.
Washburn et al, *Low Power Gas Ignition Device*, Advanced Ceramics, Norton Company, Worcester, Mass., pp. 134–149.
Willkens et al, *High Voltage Miniature Igniter Development*, Norton Igniter Products, Worcester, Mass., pp. 1–9.

*Primary Examiner*—Tu B. Hoang
*Attorney, Agent, or Firm*—Thomas M. DiMauro

[57] ABSTRACT

A ceramic igniter comprising:
a) a pair of electrically conductive portions, each portion having a first end,
b) a hot zone disposed between and in electrical connection with each of the first ends of the electrically conductive portions, the hot zone having an electrical path length of less than 0.5 cm, and
c) an electrically non-conductive heat sink material contacting the hot zone.

24 Claims, 5 Drawing Sheets

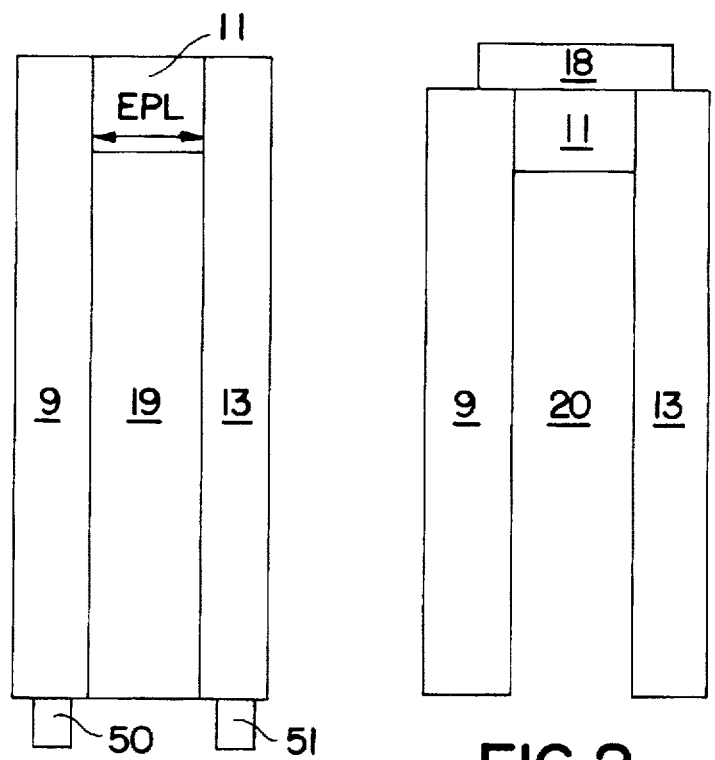
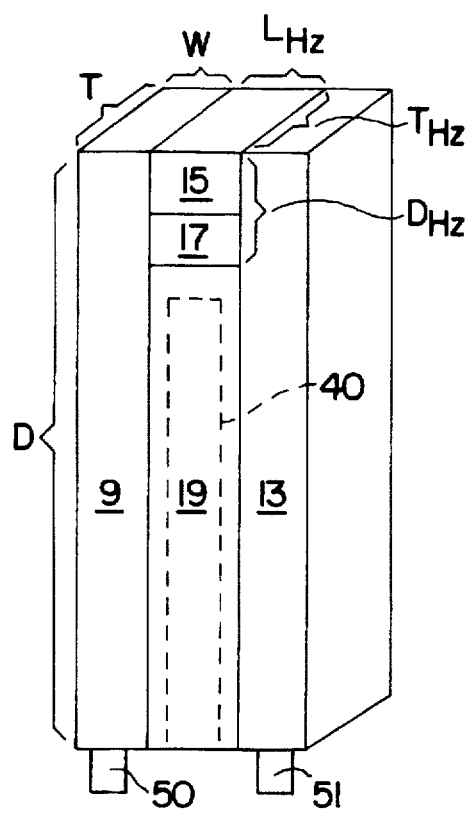
FIG. 1
FIG. 2
FIG. 3

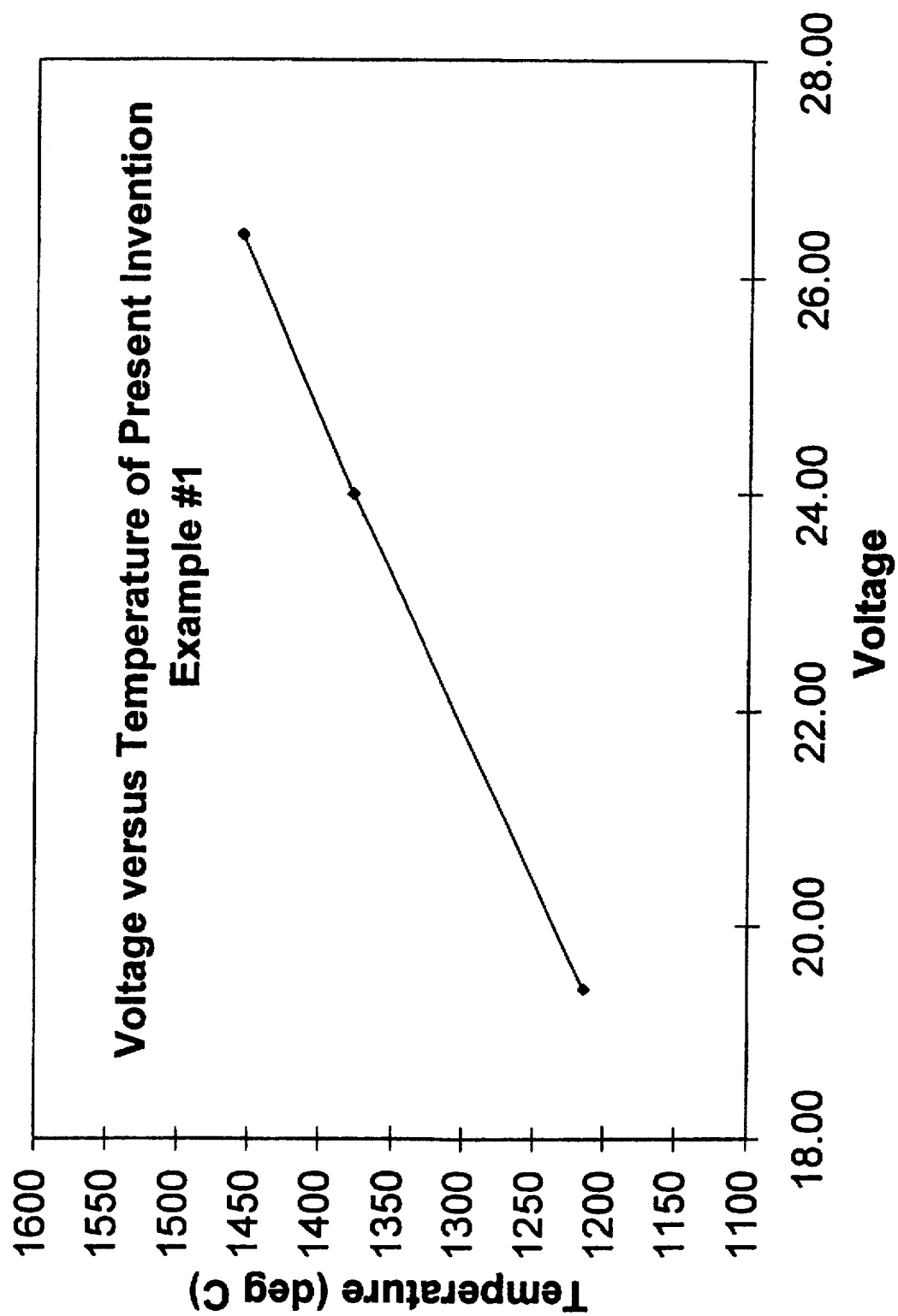

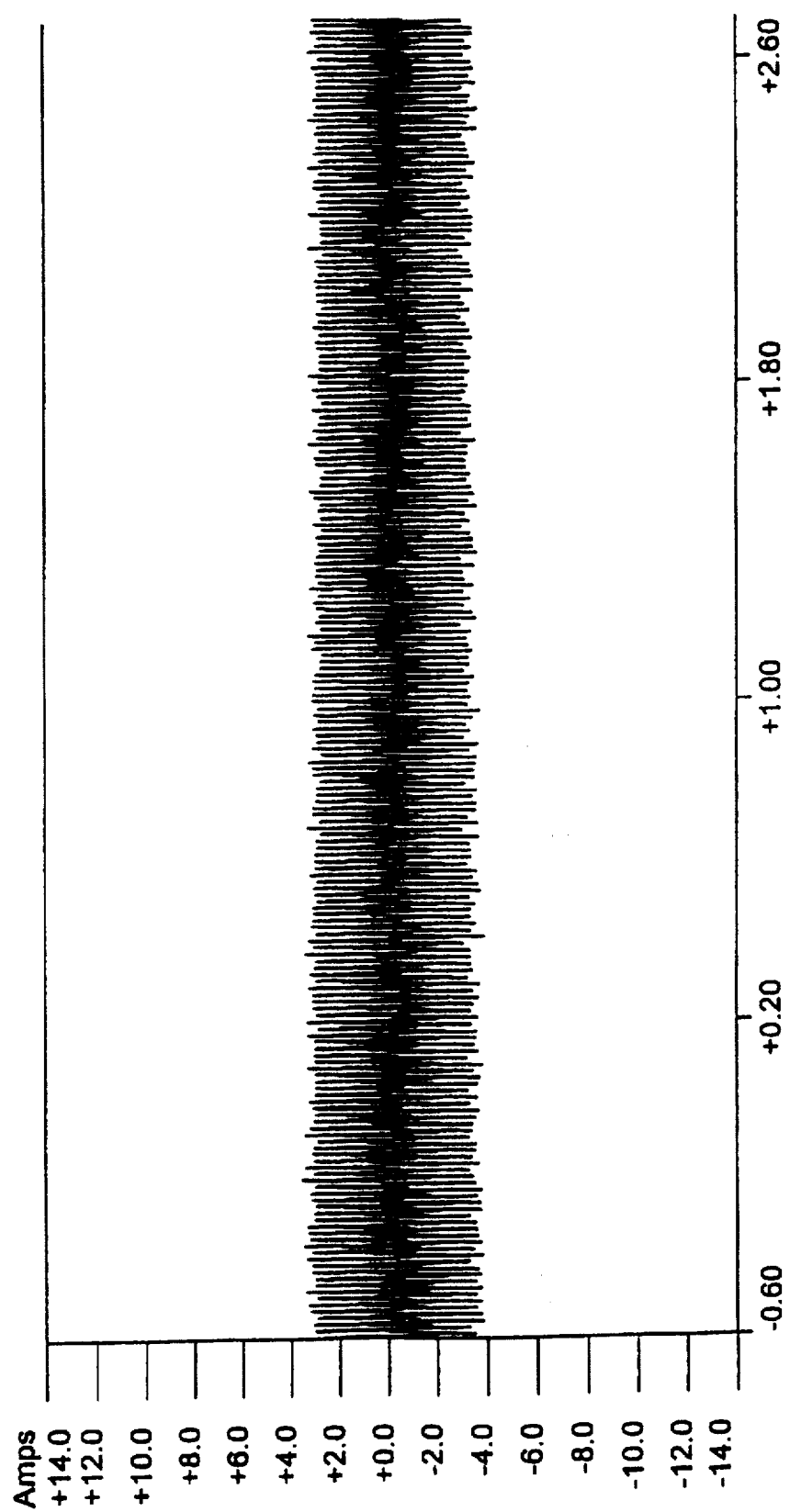

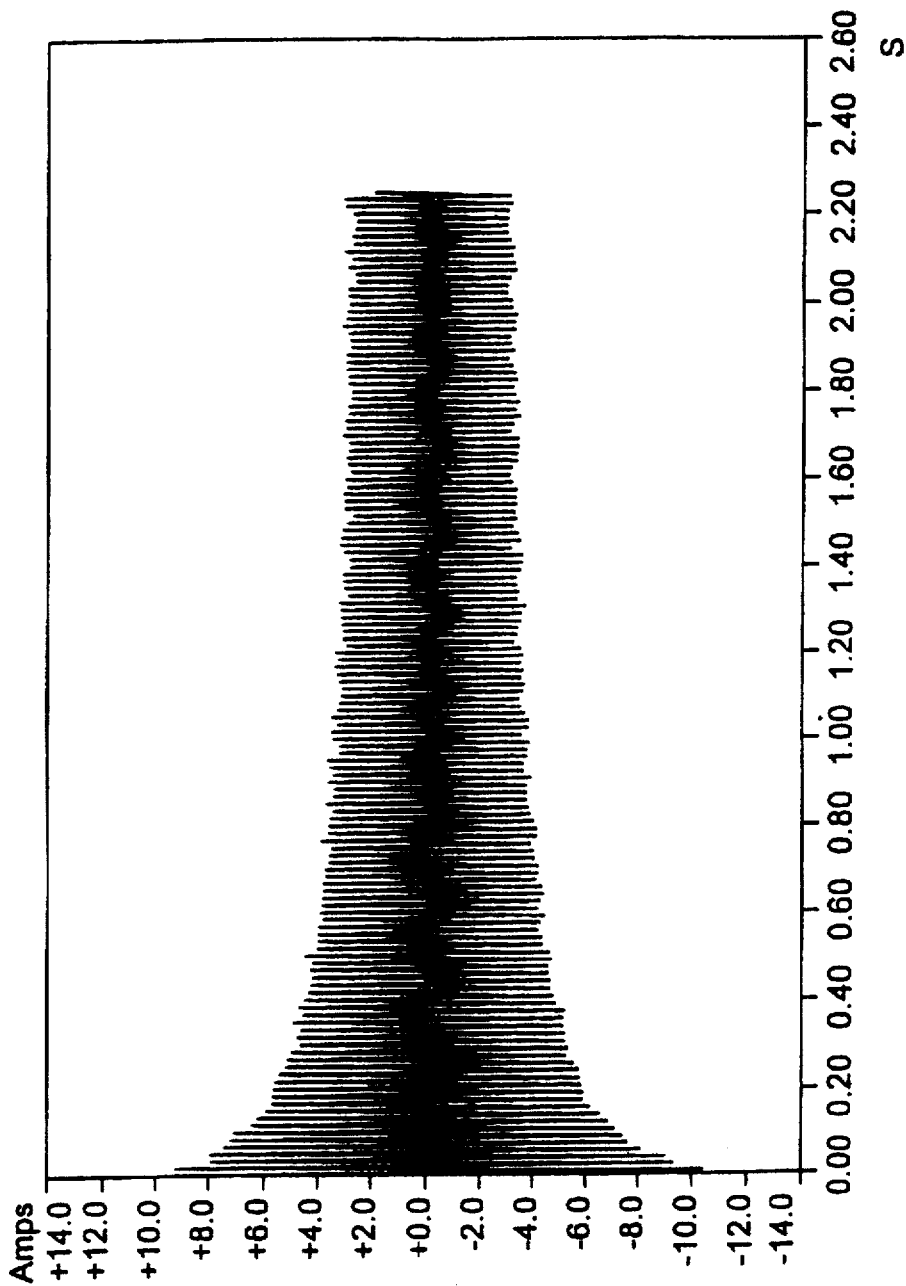

MATCH HEAD CERAMIC IGNITER AND METHOD OF USING SAME

BACKGROUND OF THE INVENTION

Ceramic materials have enjoyed great success as igniters in gas fired furnaces, stoves and clothes dryers. A ceramic igniter typically has a hair-pin shape which contains conductive end portions and a highly resistive middle portion. When the igniter ends are connected to electrified leads, the highly resistive portion (or "hot zone") rises in temperature. Some of these igniters must meet the following requirements set by the appliance and heating industries to anticipate variations in line voltage:

| | |
|---|---|
| Time to design temperature | <5 sec |
| Minimum temperature at 85% of design voltage | 1100° C. |
| Design temperature at 100% of design voltage | 1350° C. |
| Maximum temperature at 110% of design voltage | 1500° C. |
| Hot-zone Length | <1.5" |
| Power (W) | 65–100. |

U.S. Pat. No. 5,085,804 ("the '804 patent") along with companion U.S. Pat. No. 5,405,237 disclose compositions suitable for a hot zone of a ceramic igniter, the hot zone comprising:

(a) between 5 and 50 v/o $MoSi_2$, and (b) between 50 and 95 v/o of a material selected from the group consisting of silicon carbide, silicon nitride, aluminum nitride, boron nitride, aluminum oxide, magnesium aluminate, silicon aluminum oxynitride, and mixtures thereof. According to the '804 patent, these compositions provide the proper speed, room temperature resistivity and high temperature resistivity required for attaining the above-noted requirements without constraining the shape of the igniter.

One conventional igniter, the Mini-Igniter™, available from the Norton Company of Milford, N.H., uses a hot zone composition from the '804 patent which comprises aluminum nitride ("AlN"), molybdenum disilicide ("$MoSi_2$"), and silicon carbide ("SiC") and a total hot zone length of between about 1.5 cm (for 12V applications) and 6 cm (for 120 V applications). Although the Mini-Igniter™ performs well in many applications, its speed (i.e., the time it takes to heat up from room temperature to the 1350° C. design temperature) is typically between 3 and 5 seconds (for 24V to 120V applications). It is believed the applicability of these igniters could be greatly expanded if their speed could be decreased below 3 seconds.

Attempts have been made to increase the speed of these igniters. For example, Washburn and Voeller, "Low Power Gas Ignition Device, presented in the Proceedings of the 1988 International Appliance Technical Conference—Europe" (1988), pp.134–149, discloses achieving speeds as low as 1.5 seconds by reducing the mass of the hot zone to about 0.07 to 0.08 grams (i.e., a length of about 1.0 cm to 1.3 cm). However, it is believed these igniters would be very susceptible to blowout caused by convective cooling. Willkens et al. "High Voltage Miniature Igniter Development", International Appliance Technical Conference, Madison, Wis. (1994) advise designing the length of the hot zone to be at least 0.7 inches (1.8 cm) for a 120V igniter. The '804 patent also advises providing a hot zone length of at least 0.2 inches (or about 0.5 cm) as a practical minimum limit.

In addition, these igniters generally experience a very high in-rush current (i.e. a current of about 10 amperes in the first millisecond) before settling down to a conventional 2 to 3 ampere current. Since any transformer designed for use with these igniters must be designed to accept this initial high current, these igniters must be paired with a transformer capable of receiving higher power instead of the less costly transformer rated for a lower power.

Simply lowering the resistivity of the hot zone composition (by increasing its conductive $MoSi_2$ content) has been considered as a method of increasing the speed of the igniter. However, it was found that doing so increases the inrush current to even higher levels (due to a lower room temperature resistivity) and makes the igniter prone to burnout due to unacceptably high power levels for the typical igniter geometry. These igniters are unable to radiate energy sufficiently to produce a stable temperature.

Similarly, raising the resistivity of the hot zone composition (by decreasing its $MoSi_2$ content) has been considered as a method of decreasing the inrush current of the igniter. However, it was found that doing so not only decreased the speed of the igniter(due to a higher room temperature resistivity), it also provided an unstable igniter at high temperatures (due to its negative temperature coefficient of resistance at high temperature).

Therefore, there is a need for a ceramic igniter which has high speed but also resists cooling effects, and which has a low inrush current.

SUMMARY OF THE INVENTION

In accordance with the present invention, there is provided a ceramic igniter comprising:

a) a pair of electrically conductive portions, each portion having a first end, b) a resistive hot zone disposed between and in electrical connection with each of the first ends of the electrically conductive portions, the hot zone having an electrical path length of less than 0.5 cm, and c) an electrically non-conductive heat sink material contacting the hot zone.

For the purposes of the present invention, the "electrical path length" is the shortest path taken by an electrical current through the hot zone when an electrical potential is applied to the conductive ends of the igniter.

Also in accordance with the present invention, there is provided a method of heating, comprising the steps of:

a) providing a ceramic igniter comprising:
   i) a pair of electrically conductive portions, each portion having a first end,
   ii) a resistive hot zone disposed between and in electrical connection with each of the first ends of the electrically conductive portions, the hot zone having an electrical path length of no more than 0.5 cm, and
   iii) an electrically non-conductive heat sink material contacting the hot zone, b) applying a voltage of between 3 V and 60 V between the conductive ends of the igniter to produce an inrush current and a steady state current such that the ratio of the steady state current to the inrush current is at least 35% (preferably at least 50%), and raising the temperature of the hot zone to about 1350° C. in less than 3 seconds (preferably less than 2 seconds).

DESCRIPTION OF THE FIGURES

FIG. 1 is a cross-sectional view of a preferred embodiment of the present invention, wherein the electrically insulating heat sink is disposed as an insert between the conductive legs of the igniter.

FIG. 2 is a cross-sectional view of a preferred embodiment of the present invention, wherein the electrically insulating heat sink contacts the opposing side of the hot zone.

FIG. 3 is a perspective view of a preferred igniter of the present invention.

FIG. 7 displays the electrical performance of Example I in terms of voltage and temperature. FIGS. 8a and 8b display the inrush amperage over time for the igniter of the present invention (8a) and the prior art igniter (8b).

DESCRIPTION OF THE INVENTION

Figure 4:
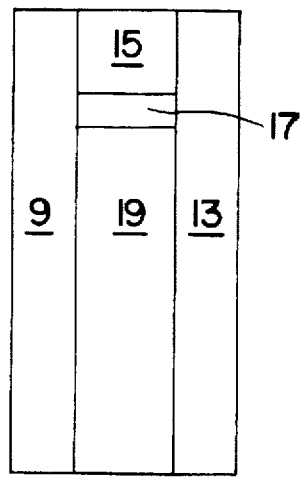
FIG. 4 is a cross-sectional view of an igniter of the present invention wherein the hot zone comprises two resistive sections.

It has been found that decreasing the hot zone electrical path length to less than 0.5 cm and contacting the hot zone with an electrically insulating heat sink material produces a commercially acceptable igniter which has high speed, high resistance to convective cooling, and a low inrush current. Moreover, when electronics or transformers are used to lower the effective voltage seen by the igniter, the lower inrush current of the present invention lessens the need for such extensive and expensive modifications.

Without wishing to be tied to a theory, it is believed the added thermal mass of the heat sink significantly slows convective cooling of the hot zone, thereby allowing the hot zone to remain hot under convective cooling conditions despite its small length.

In preferred embodiments, the igniter has a hairpin configuration comprising two parallel conductive legs and a connecting hot zone bridge positioned therebetween, with the remaining space between the legs being at least partially filled by an electrically insulating heat sink material such as aluminum nitride which contacts the hot zone. For example, as shown in FIG. 1, one preferred igniter of the present invention has a hairpin shape comprising two conductive legs 9 and 13 placed in electrical connection by a resistive hot zone 11, the legs 13 extending from the hot zone in the same direction.

The electrical path length of the hot zone, shown as EPL in FIG. 1, is less than 0.5 cm. Insulating heat sink material 19 is provided as an insert to contact the hot zone and substantially fill the remaining space between the conductive legs extending from the hot zone 11. When paired leads 50 and 51 are attached to each of the conductive ends 9 and 13 and a voltage is applied thereto, current travels from the first lead 50 to first conductive leg 9, through the hot zone 11 (thereby causing the temperature of the hot zone to rise), and then through the second conductive leg 13 where it exits through the second lead 51.

In other embodiments, the electrically insulating heat sink material can contact other surfaces of the hot zone. As in FIG. 2, the electrically insulating heat sink material 18 contacts hot zone 11 on the opposing side of the space 20 created between the parallel conductive legs 9 and 13. This design still provides the heat sink contact desirable for high speeds and low in-rush current without altering the electrical characteristics of the igniter.

Typically, the hot zone has a high temperature (i.e., 1350° C.) resistivity of between about 0.001 ohm-cm and about 3.0 ohm-cm, a room temperature resistivity of between about 0.01 ohm-cm and about 3 ohm-cm, and is usually characterized by a positive temperature coefficient of resistance ("PTCR"). In preferred embodiments, the hot zone comprises a first resistive material comprising:

(a) between about 50 and about 75 vol % of an electrically insulating material selected from the group consisting of aluminum nitride, boron nitride, silicon nitride, and mixtures thereof, (b) between about 10 and about 45 vol % of a semiconductive material selected from the group consisting of silicon carbide and boron carbide, and mixtures thereof, and (c) between about 8.5 and about 14 vol % of a metallic conductor selected from the group consisting of molybdenum disilicide, tungsten disilicide, tungsten carbide, titanium nitride, and mixtures thereof.

In more preferred embodiments, the hot zone comprises a first resistive material comprising between 50 vol % and 75 vol % AlN, between 13 vol % and 41.5 vol % SiC, and between 8.5 vol % and 12 vol % $MoSi_2$. In other embodiments, the hot zone further comprises between 1 v/o and 10 v/o alumina, preferably in accordance with U.S. Pat. No. 5,514,630, the specification of which is incorporated by reference herein.

Referring now to FIG. 3, the hot zone typically has a thickness $T_{hz}$ of between about 0.05 cm and 0.2 cm, preferably between about 0.06 cm and 0.125 cm. Its length $L_{hz}$ (which, in FIG. 3, is the same as the electrical path length) is generally between 0.05 cm and 0.45 cm, preferably between 0.15 cm and 0.25 cm. Its depth $D_{hz}$ is generally between 0.05 cm and 0.4 cm, preferably between 0.1 cm and 0.25 cm.

Preferably, the particle sizes of both the starting powders and the grains in the densified hot zone are similar to those described in the '804 patent. In some embodiments, the average grain size ($d_{50}$) of the hot zone components in the densified body is as follows: a) electrically insulative material (i.e., AlN): between about 2 and 10 microns; b) semiconductive material (i.e., SiC): between about 1 and 10 microns; c) and metallic conductor (i.e., $MoSi_2$): between about 1 and 10 microns.

In some embodiments, the hot zone comprises a pair of resistive sections disposed in parallel between the conductive ends. For example, as shown in FIG. 4, the hot zone can comprise first resistive section 15 and second resistive section 17, each of which is in parallel electrical connection with each of the conductive ends 9 and 13. In this particular embodiment, the first section is designed to have a lower resistivity than the second section. Without wishing to be tied to theory, it is believed that, at room temperature, the first resistive section has a sufficiently low resistivity to provide the speed needed to heat the igniter, while the second section has a sufficiently high resistivity to inhibit the inrush current. At high temperatures (i.e., 1350° C.), it is believed the relatively high resistivity of the second resistive section is sufficiently high (relative to the first resistive section) so as to prevent overpowering of the igniter.

Preferably, second resistive section 17 of the hot zone has the same thickness and length as the first resistive section. Its depth is generally between about 0.25 cm and about 0.125 cm, preferably between 0.05 cm and 0.1 cm. Its room temperature resistivity and its 1350° C. resistivity are typically higher than those corresponding to the first resistive section.

In one embodiment of the invention, the second resistive section is formed in-situ by a reaction between the powders selected to form the first resistive section 15 and powders selected to form electrically insulating heat sink 19 disposed between the legs of a conventional hairpin igniter. Without wishing to be tied to a theory, it is believed that the conductive components of the first resistive section 15 preferentially diffuse into the powders of the electrically insulating heat sink 19 and react therewith, thereby creating a diffuse second resistive section 17 typically having a depth of between about 1% to about 20% of the depth of the first resistive section 15.

The function of the electrically insulating heat sink material 19 is to provide sufficient thermal mass to mitigate convective cooling of the hot zone. When disposed as an insert between the two conductive legs, it also provides mechanical support for the conductive legs 9 and 13 and so makes the igniter more rugged. The insert typically has a thickness and length similar to conductive legs 9 and 13 and a width equal to the portion of the hot zone which bridges the legs. In some embodiments, the insert may be provided with a slot 40 (as in FIG. 3) to reduce the mass of the system. Preferably, the electrically insulating heat sink has a resistivity of at least about $10^4$ ohm-cm and a strength of at least about 150 MPa. More preferably, the heat sink material has a thermal conductivity which is not so high as to heat the entire heat sink and transfer heat to the leads, and not so low as to negate its beneficial heat sink function. Suitable ceramic compositions for the heat sink include compositions comprising at least 90 v/o of (and preferably consisting essentially of) at least one of aluminum nitride, boron nitride, silicon nitride, alumina, and mixtures thereof. In embodiments using an AlN—$MoSi_2$—SiC hot zone, it was found that a heat sink material comprising at least 90 vol % aluminum nitride and up to 10 vol % alumina possessed compatible thermal expansion and densification characteristics. However, it was found that the alumina also inhibited the reaction needed for the effective formation of the in-situ second resistive section. Accordingly, when in-situ formation of the second resistive section is contemplated, the insert preferably consists essentially of at least one of aluminum nitride, boron nitride, and silicon nitride, and mixtures thereof, more preferably aluminum nitride. Likewise, when the hot zone is designed to have a less significant in-situ formed resistive section, the electrically insulating heat sink material comprises between 1 v/o and 10 v/o alumina. In other embodiments, 1–10 v/o of the insert is a densification aid selected from the group comprising alumina, calcia, magnesia, silica and (preferably) yttria, and mixtures thereof. In preferred embodiments, the dimensions of the inserts are 4.0 cm (depth)×0.25 cm (width)×0.1 cm (thickness).

Conductive ends 9 and 13 provide means for electrical connection to wire leads. Preferably, they also are comprised of AlN, SiC and $MoSi_2$, but have a significantly higher percentage of the conductive and semiconductive materials (i.e., SiC and $MoSi_2$) than do the preferred hot zone compositions. Accordingly, they typically have much less resistivity than the hot zone and do not heat up to the temperatures experienced by the hot zone. They preferably comprise about 20 to 65 v/o aluminum nitride, and about 20 to 70 v/o $MoSi_2$ and SiC in a volume ratio of from about 1:1 to about 1:3. More preferably, the conductive ends comprise about 60 v/o AlN, 20 v/o SiC and 20 v/o $MoSi_2$. In preferred embodiments, the dimensions of conductive ends 9 and 13 are 0.05 cm (width)×4.2 cm (depth)×0.1 cm (thickness). In other embodiments, conductive metal can be deposited upon the heat sink material and hot zone to form the conductive legs.

Figure 5:
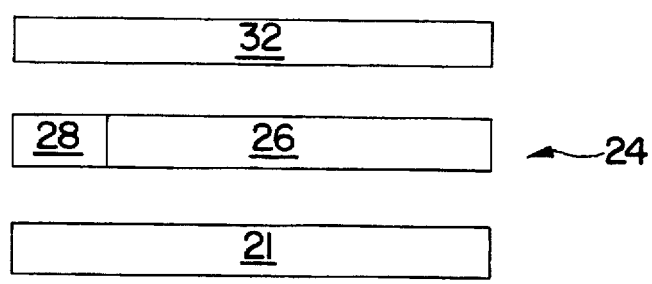
FIG. 5 displays an exploded view of a preferred green body of the present invention.

Also in accordance with the present invention, there is provided a preferred method of making the present invention, wherein tiles made of warm pressed powder mixtures having predetermined compositions are arranged so that the tile cross-section depicts an electrical circuit. In one preferred process for making the invention (and as shown in FIG. 5), a first tile 21 consisting essentially of a conductive portion is laid on a flat surface (not shown). A second tile 24 having an insulative portion 26 and a first resistive material 28 is then laid atop the first tile 21 in the manner shown. Next, a third tile 32 having only a conductive section is laid atop the second tile. This laminate is then densified so that the disparate tiles join. The densified laminate is then sliced across its thickness to form a plurality of individual ceramic igniters.

In making the present invention, each green tile shown in FIG. 5 comprises an entire layer of the ceramic laminate (e.g., second tile 24 has an insulative portion 26 and resistive section 28). Alternatively, the tiles may consist of only one portion of a layer. In the latter case, it has been found that tiles comprising a portion of a layer may be glued together without any attendant loss in properties.

Figure 6:
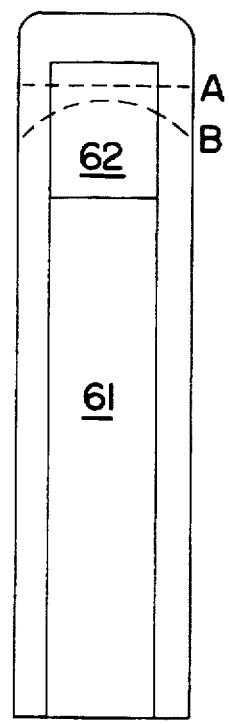
FIG. 6 is a cross section view of an igniter of the present invention made with tape cast conductive legs.

Although FIG. 5 presents each layer as rigid green tiles, these portions alternatively can be made by either tape casting, roll compaction, warm pressing followed by slicing, dry pressing or screen printing. In another preferred embodiment, as shown in FIG. 6, green tape 60 having a conductive composition is wrapped around three sides of a tile having an electrically insulating heat sink 61 and a hot zone 62. After densification, a portion of the tape which wraps around the hot zone is removed by grinding, as shown by the dotted line A in FIG. 6, to provide the desired circuit. Optionally, the igniter can be further ground along dotted line B to produce a rounded tip, match stick appearance.

When the igniter uses the electrically insulating heat sink material as an insert, the igniter may be made by the general method disclosed in U.S. Pat. No. 5,191,508, the specification of which is incorporated by reference.

The processing of the ceramic component (i.e., green body processing and sintering conditions) and the preparation of the igniter from the densified ceramic can be done by any conventional method. Typically, such methods are carried out in substantial accordance with the '804 patent, the specification of which is incorporated by reference. In preferred embodiments, the green laminates are densified by hot isostatic pressing in a glass media as disclosed in U.S. Pat. No. 5,514,630, the specification of which is incorporated by reference. The densification yields a ceramic body whose hot zone has a density of at least 95%, preferably at least about 99%, of theoretical density. The average grain size of the densified hot zone is typically between 1 and 10 um, preferably between 1 and 3 um.

The igniters of the present invention may be used in many applications, including gas phase fuel ignition applications such as furnaces and cooking appliances, baseboard heaters, gas or oil boilers and stove tops. In one preferred embodiment, four 30 V igniters of the present invention are provided in series and used as ignition sources for gas-fired heating elements on a 120 V gas range.

Although the igniter of the present invention is typically used in the voltage range of 3V to 60 V, it is more typically used in the range of 12V to 40V. In the 3–9V range, it is believed that using a smaller hot zone length and/or increasing the $MoSi_2$ content would provide the lower resistance needed to produce suitable properties.

In addition, the exposed resistive hot zones of the present invention display a higher surface loading of power, measured in watts/cm² of the hot zone surface area, than the conventional '804 style igniter. The exposed resistive hot zone surface loading of the igniters of the present invention, which is typically between 200 and 400 watts/cm², represents an improvement over the '804-style igniter, which could provide a surface loading of only about 20–40 watts/cm² (see Table at col. 7–8 of the '804 patent) before experiencing burnout. Without wishing to be tied to a theory, it is believed the higher surface loading is the reason why the igniters of the present invention are much more resistant to convective cooling.

In some embodiments, the hot zone and/or the legs can be coated with a layer of a protective ceramic such as CVD AlN or $Si_3N_4$. In these embodiments, the coated igniter is protected from carbon and soot depositing on the small hot zone and causing a short.

The practice of the present invention can be further appreciated from the following non-limiting Examples and Comparative Examples. For the purposes of the present invention, a "stable" igniter is one which maintains a constant resistivity and a constant temperature at a given voltage.

EXAMPLE I

A green laminate was constructed in substantial accordance with the design shown in FIG. 5. A composite powder comprising a hot zone powder mixture of 64 v/o AlN, 25 v/o SiC, and 11 v/o $MoSi_2$ next to an electrically insulating heat sink powder consisting essentially of 100 v/o aluminum nitride powder was warm pressed to form a billet which was then sliced to form green tile 24 of FIG. 5. The hot zone portion of the warm pressed green body had a density of about 63% of theoretical density, while the AlN portion had a density of about 60% of theoretical density. The green tiles representing the conductive ends were made by warm pressing powder mixtures containing 20 v/o AlN, 60 v/o SiC, and 20 v/o $MoSi_2$ to form a billet having a density of about 63% of theoretical density, from which tiles 21 and 32 of FIG. 5 were sliced. The green tiles were laminated as in FIG. 5, and then densified by glass hot isostatic pressing at about 1800° C. for about 1 hour to form a ceramic block having an in-situ formed second resistive section. The block was then sliced across its width to produce a plurality of hot surface elements measuring 1.5"×0.150"×0.030"(3.81 cm×0.75 cm×0.076 cm). The resulting hot zone comprised a first resistive section having a depth of about 0.125 cm, and an in-situ formed second resistive section having a depth of about 0.05 cm. The hot zone length (EPL) and thickness were about 0.25 cm and 0.076 cm, respectively.

Suitable leads were attached to the conductive portions of the hot surface element and a voltage of about 30 V was applied.

The electrical performance of the resulting nominal 24V igniter is shown in FIG. 7 in terms of voltage and temperature. Since the low temperature resistance is lower than the high temperature resistance, the hot zone has an effective PTCR. The igniter displayed stable heating performance and reached the design temperature of 1100° C.–1350° C. in only about 1.0 second. As shown in FIG. 8a, the inrush current was found to be only 3.2 amperes. The power, which was measured at 54 watts, provided an exposed resistive hot zone surface loading of about 300 watts/cm².

EXAMPLE II

This example is intended to show the superior resistance to convective cooling provided by the igniter of the present invention as compared to those in Comparative Example I below.

An igniter was made in substantial accordance with Example I. The electrical path length of this igniter was 0.25 cm. When this igniter was energized with 24V, it produced a current of 1.8 amps and a stable temperature of 1408° C.

A gas canister which provides 400 cc/min (ccm) of air was placed about 1 foot from the igniter. A stream from the air jet only reduced the hot zone temperature to about 1182° C. The air jet did not blow out the igniter.

Comparative Example I

A conventional 24V igniter marketed by the Norton Company under the '804 patent was selected for comparison. It had an hot zone electrical path length of about 2.05 cm. When energized with 24V, it reached about 1100° C.–1350° C. in about 2–3 seconds, and produced at stable temperature of 1410° C. As shown in FIG. 8b, it had an in-rush amperage of about 11 amps which settled down to about 3 amps. A stream from the air jet described above reduced the hot zone temperature to about 950° C., which is below the desired 1100° C. minimum.

A conventional 12V igniter marketed by the Norton Company under the '804 patent was energized with 12V and produced a stable current of about 2.0 amps and a stable temperature of 1400° C. A stream from the air jet described above reduced the hot zone temperature to less than 600° C.

EXAMPLE III

This example shows the superior life testing results of the igniter of the present invention.

A 24 V igniter similar to that used in Example II was subjected to life cycle testing, wherein the igniter is turned on for 20 seconds and then turned off for 20 seconds. After 543,000 cycles, the decrease in amperage was only 5.43%. This small change represents an improvement over the standard '804 patent igniter, which typically showed a 16% decrease over similar cycling. The temperature of the igniter of the present invention was originally was about 1393° C. and only decreased to about 1379° C. over the life cycle test.

EXAMPLE IV

This example examines the behavior of an igniter wherein the hot zone composition is contacted by an electrically insulating heat sink material whose composition inhibits formation of an insitu formed resistive section. In particular, it shows the benefit provided by the in-situ formed second resistive portion in decreasing in-rush amperage.

An igniter was made in a substantially similar manner to the igniter described in Example II above, except that 4 v/o alumina was added to the insert composition to inhibit in-situ formation of a second resistive composition.

Examination of the microstructure of the resulting ceramic revealed a lesser degree of insitu formation of a second resistive section. It is believed the alumina addition effectively inhibited the formation of a second resistive section.

When a 24V voltage was applied to this igniter, it reached about 1350° C. in about 1 second and was stable. As shown in FIG. 8c, its in-rush amperage was only 4 amps, and so was lower than the inrush amperage of the conventional '804-style igniter but higher than that of Example I. It later settled to about 2 amps.

Comparative Example II

This comparative example demonstrates the superior surface loading of the igniter of the present invention.

A standard 24V igniter was energized with 24V and produced a stable temperature and a 1.57 amperage. When the voltage was increased to 35 volts (thereby producing an amperage of 2.3 amps), the igniter failed. The surface loading of the igniter at failure was only about 60 watts/cm$^2$. By comparison, the igniter of Example I had an exposed resistive hot zone surface loading of about 300 watts/cm$^2$.

We claim:

1. A ceramic igniter comprising:
   a) a pair of electrically conductive portions, each portion having a first end,
   b) a resistive hot zone disposed between and in electrical connection with each of the first ends of the electrically conductive portions, the hot zone having an electrical path length of less than 0.5 cm, and
   c) an electrically non-conductive heat sink material contacting the hot zone.

2. The igniter of claim 1 wherein the hot zone has a room temperature resistivity of between about 0.01 ohm-cm and about 3.0 ohm-cm and a 1350° C. resistivity of between about 0.001 ohm-cm and about 3.0 ohm-cm.

3. The igniter of claim 1 wherein the hot zone comprises a first resistive material having a composition comprising:
   (a) between about 50 and about 75 vol % of an electrically insulating material selected from the group consisting of aluminum nitride, boron nitride, silicon nitride, and mixtures thereof,
   (b) between about 10 and about 45 vol % of a semiconductive material selected from the group consisting of silicon carbide and boron carbide, and mixtures thereof, and
   (c) between about 8.5 and about 14 vol % of a metallic conductor selected from the group consisting of molybdenum disilicide, tungsten disilicide, tungsten carbide, titanium nitride, and mixtures thereof.

4. The igniter of claim 3 wherein the electrically non-conductive heat sink material is a ceramic selected from the group consisting of AlN, Si$_3$N$_4$, BN, Al$_2$O$_3$, and mixtures thereof.

5. The igniter of claim 3 wherein the electrically conductive portions further comprise second ends extending in the same direction from the hot zone to define a pair of legs, and the electrically non-conductive heat sink material is disposed between the legs.

6. The igniter of claim 3 wherein the hot zone further comprises an in-situ formed resistive portion disposed between the first resistive material and the electrically non-conductive heat sink material.

7. The igniter of claim 3 wherein the hot zone further comprises a second resistive material having a resistivity which is higher than the resistivity of the first resistive material.

8. The igniter of claim 3 wherein the electrically non-conductive heat sink material comprises at least 90 v/o of a ceramic selected from the group consisting of AlN, Si$_3$N$_4$, BN, Al$_2$O$_3$, and mixtures thereof.

9. The igniter of claim 8 wherein the electrically non-conductive heat sink material consists essentially of AlN.

10. The igniter of claim 3 wherein the hot zone further comprises between 1 and 10 v/o Al$_2$O$_3$.

11. The igniter of claim 3 where the first resistive material comprises between 50 vol % and 75 vol % AlN, between 12 vol % and 41.5 vol % SiC, and between 8.5 vol % and 12 vol % MoSi$_2$.

12. The igniter of claim 3 wherein the hot zone has an electrical path length of between 0.05 and 0.45 cm.

13. The igniter of claim 3 wherein the hot zone has an electrical path length of between 0.15 cm and 0.25 cm.

14. The igniter of claim 3 wherein the hot zone has a thickness of between 0.05 cm and 0.2 cm, and a depth of between 0.05 cm and 0.4 cm.

15. The igniter of claim 3 wherein the hot zone has an average grain size of between 1 and 10 um.

16. The igniter of claim 3 wherein the hot zone has an average grain size of between 1 and 3 um.

17. The igniter of claim 3 wherein the hot zone has a density of at least 95% of theoretical density.

18. The igniter of claim 3 wherein the hot zone has a density of at least 99% of theoretical density.

19. The igniter of claim 7 wherein the second resistive material has a depth of between about 1% and about 20% of the depth of the first resistive material.

20. The igniter of claim 8 wherein the electrically insulating heat sink material further comprises a sintering aid selected from the group consisting of yttria, magnesia, calcia and silica, and mixtures thereof.

21. A method of heating, comprising the steps of:
   a) providing a ceramic igniter comprising:
      i) a pair of electrically conductive portions, each portion having a first end,
      ii) a resistive hot zone disposed between and in electrical connection with each of the first ends of the electrically conductive portions, the hot zone having an electrical path length of less than 0.5 cm, and
      iii) an electrically non-conductive heat sink material contacting the hot zone,
   b) applying a voltage of between 3 V and 60 V between the conductive ends of the igniter to produce an inrush current and a steady state current such that the ratio of the steady state current to the inrush current is at least 35%, and raising the temperature of the hot zone to about 1350° C. in less than about 3 seconds.

22. The method of claim 21, wherein the ratio of the steady state current to the inrush current is at least 50%.

23. The method of claim 21 wherein the resistive hot zone comprises a first resistive material having a composition comprising:
   (a) between about 50 and about 75 vol % of an electrically insulating material selected from the group consisting of aluminum nitride, boron nitride, silicon nitride, and mixtures thereof,
   (b) between about 10 and about 45 vol % of a semiconductive material selected from the group consisting of silicon carbide and boron carbide, and mixtures thereof, and
   (c) between about 8.5 and about 14 vol % of a metallic conductor selected from the group consisting of molybdenum disilicide, tungsten disilicide, tungsten carbide, titanium nitride, and mixtures thereof.

24. The method of claim 21 wherein the resistive hot zone comprises a first resistive material comprising between 50 vol % and 75 vol % AlN, between 13 vol % and 41.5 vol % SiC, and between 8.5 vol % and 12 vol % MoSi$_2$.

* * * * *